United States Patent
Megdanoff et al.

(10) Patent No.: US 10,922,806 B2
(45) Date of Patent: Feb. 16, 2021

(54) SOUND-BASED FLOW CHECK SYSTEM FOR WASHER SYSTEM

(71) Applicant: GM GLOBAL TECHNOLOGY OPERATIONS LLC, Detroit, MI (US)

(72) Inventors: Christopher D. Megdanoff, Brighton, MI (US); Jason A. Lupienski, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 88 days.

(21) Appl. No.: 16/267,895

(22) Filed: Feb. 5, 2019

(65) Prior Publication Data
US 2020/0250808 A1 Aug. 6, 2020

(51) Int. Cl.
| G06T 7/00 | (2017.01) |
| H04R 1/40 | (2006.01) |
| G01F 1/66 | (2006.01) |
| B60S 1/66 | (2006.01) |
| H04R 3/00 | (2006.01) |

(52) U.S. Cl.
CPC .............. *G06T 7/0004* (2013.01); *B60S 1/66* (2013.01); *G01F 1/666* (2013.01); *H04R 1/406* (2013.01); *H04R 3/005* (2013.01); *G06T 2207/30108* (2013.01)

(58) Field of Classification Search
None
See application file for complete search history.

(56) References Cited

U.S. PATENT DOCUMENTS

| 2004/0122602 A1* | 6/2004 | Nagase | G01M 3/24 |
| | | | 702/51 |
| 2016/0061640 A1* | 3/2016 | Joshi | G01F 15/18 |
| | | | 73/197 |
| 2017/0089800 A1* | 3/2017 | Huseynov | G01S 5/20 |

\* cited by examiner

*Primary Examiner* — Leon Viet Q Nguyen

(57) ABSTRACT

A system and method to check for flow anomalies, such as leaks, in a washer system includes collecting sound information originating from the washer system and collecting an image of the washer system. The system and method are configured to determine a location of a flow anomaly in the washer system based on the sound information and the image of the washer system.

16 Claims, 2 Drawing Sheets

SOUND-BASED FLOW CHECK SYSTEM FOR WASHER SYSTEM

FIELD

The subject disclosure relates to a flow check system for use with a washer system, such as an autonomous vehicle washer system. The flow check system may be used to check for leaks and other flow anomalies within the washer system.

INTRODUCTION

Vehicles (e.g., automobiles, trucks, constructions vehicles, farm equipment) increasingly include sensors that obtain information about the vehicle and its environment. An exemplary type of sensor is a camera that obtains images. Multiple cameras may be arranged to obtain a 360-degree view around the perimeter of the vehicle, for example. Another exemplary type of sensor is an audio detector or microphone that obtains sound (i.e., audio signals) external to the vehicle. Additional exemplary sensors include a radio detection and ranging (radar) system and a light detection and ranging (lidar) system. The information obtained by the sensors may augment or automate vehicle systems. Exemplary vehicle systems include collision avoidance, adaptive cruise control, and autonomous driving systems. Many of these sensors are externally mounted on the vehicle.

To provide for optimal usage of any of the vehicle sensors that are externally mounted, a multi-tube washer system may be provided. The washer system may route the plurality of tubes to each sensor. Each sensor may have a tube configured to spray liquid onto the sensor to clean the sensor and another tube configured to spray compressed air onto the sensor to dry the sensor after it is washed with the liquid. Given that an autonomous vehicle may have many sensors mounted, for example, in a rooftop sensor module, the washer system may have many corresponding tubes routed to the plurality of sensors. Leak checking during the installation of the washer system may therefore be time consuming and subject to error.

SUMMARY

The present disclosure provides a leak and flow anomaly detection system for use in root cause determination for a complex washer system. Sound information is used to determine locations of sounds caused by directing fluid (such as pressurized air) through each tube of the washer system. The sound locations are overlaid on an image of the washer system, and a determination is made as to whether the detected sounds are within the expected locations (and with expected intensities, in some variations). If a minimally sufficient sound is detected outside of an expected location, a leak location can be identified. If an area of expected flow has less than the expected flow rate, another anomaly, such as a kink or misconnection, can be identified.

In one example, which may be combined with or separate from the other examples provided herein, a flow check system for a washer system is provided. The flow check system includes an array of sound sensors configured to collect sound information originating with the washer system. The flow check system also includes a controller configured to: collect the sound information from the array of sound sensors, collect an image of the washer system, and determine a location of a flow anomaly in the washer system based on the sound information and the image of the washer system.

In another example, which may be combined with or separate from the other examples provided herein, a method of detecting a location of a flow anomaly in a washer system is provided. The method includes collecting sound information originating from the washer system, collecting an image of the washer system, and determining a location of a flow anomaly in the washer system based on the sound information and the image of the washer system.

Additional details may be provided, including but not limited to the following: wherein the flow anomaly is one of a leak and a flow that is lower than expected by a predetermined threshold; a camera configured to obtain the image of the washer system; the array of sounds sensors including multiple microphones; the multiple microphones spaced in a circular arrangement with a predetermined distance between each microphone. The array of sound sensors may be located a distance between 1 and 2 meters from the plurality of predetermined expected flow locations or from the washer system.

The controller or method may be configured to: identify a plurality of actual locations having at least a predetermined amount of flow from the washer system, based on the sound information; compare the plurality of actual locations having at least the predetermined amount of flow to a plurality of predetermined expected flow locations; and determine the location of the flow anomaly in the washer system as being an actual location having at least the predetermined amount of flow that is outside of the plurality of predetermined expected flow locations. In other examples, the flow anomaly may be located in an expected flow location, but contain no flow or an amount of flow that is different than expected. The predetermined amount of flow may be a predetermined amount of air flow.

The washer system may be an autonomous vehicle washer system having a first set of tubes configured to provide liquid washer fluid to a number of autonomous vehicle sensors and a second set of tubes configured to provide drying air to the autonomous vehicle sensors. The flow check system may also include an air flow generator configured to provide pressurized air to both the first and second sets of tubes to check for flow anomalies in both the first and second sets of tubes. Similarly, the method may include providing pressurized air to both the first and second sets of tubes to check for flow anomalies in both the first and second sets of tubes.

The method and/or controller may be further configured to create a set of images indicating locations of the sound information and to overlay the set of images indicating the locations of the sound information onto the image of the washer system. The set of images indicating locations of the sound information may vary in size and/or color, based on sound intensity. The method and/or controller may be further configured to filter the set of images indicating locations of the sound information to eliminate images representative of sound having an intensity lower than a predetermined threshold.

The above features and advantages, and other features and advantages of the disclosure are readily apparent from the following detailed description when taken in connection with the accompanying drawings.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of this disclosure. In the drawings.

DETAILED DESCRIPTION

Figure 1:
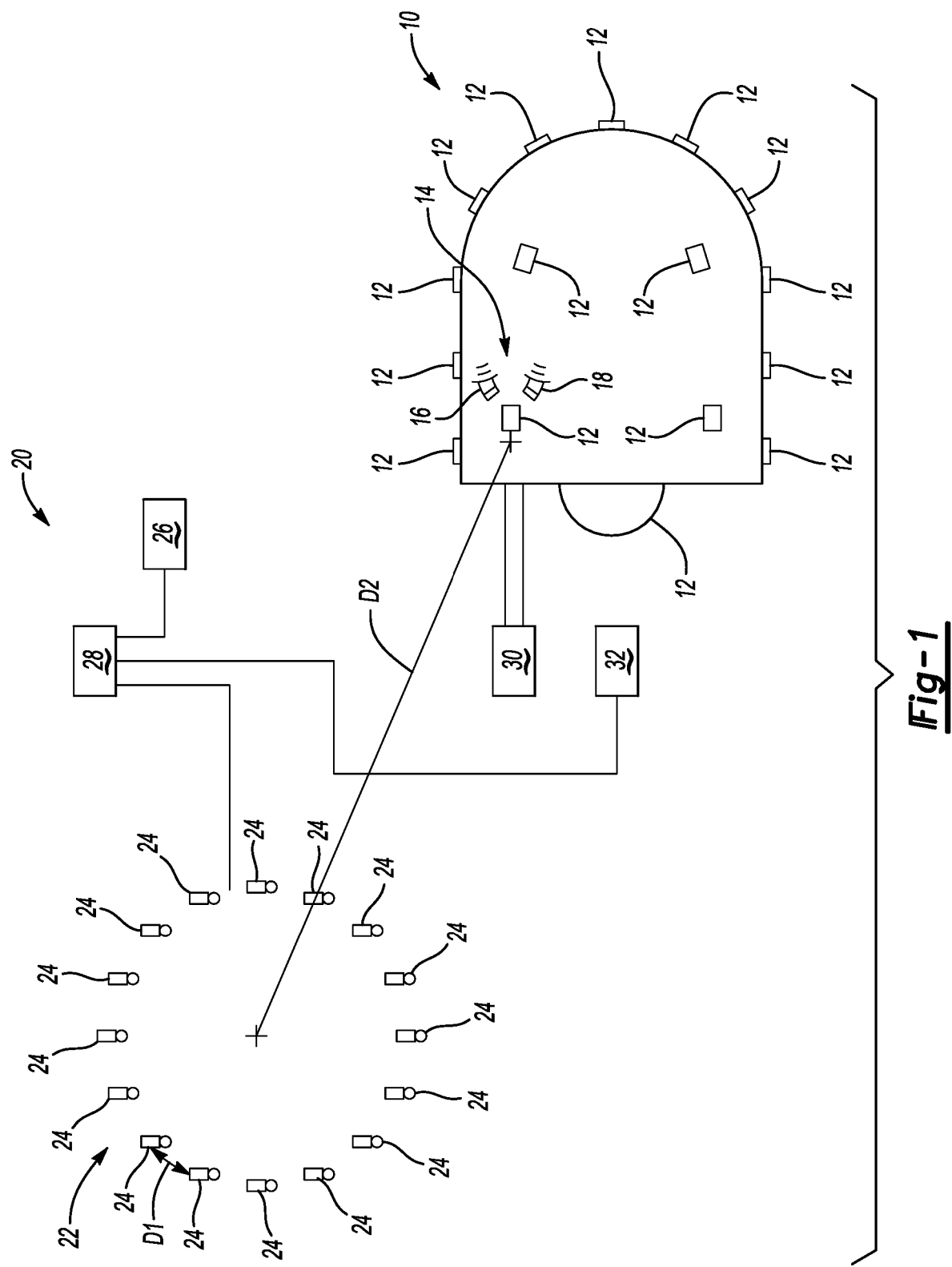
FIG. 1 is a schematic view including elements of a flow check system of a washer system and a rooftop sensor module of a motor vehicle, in accordance with the principles of the present disclosure.

The following description is merely exemplary in nature and is not intended to limit the present disclosure, its application or uses. It should be understood that throughout the drawings, corresponding reference numerals indicate like or corresponding parts and features.

Referring now to FIG. 1, a rooftop module 10 having a plurality of sensors 12 is provided. The rooftop module 10 may be installed onto an exterior of a motor vehicle (not shown), such as on the roof (not shown). As previously noted, various sensors 12 may be used to obtain information about vehicle operation or the environment around the vehicle. Sensors 12 (e.g., radar, lidar, camera, microphone) may be used to detect objects such as other vehicles, pedestrians, and the like in the vicinity of the vehicle. Though a certain number of sensors 12 are shown on the rooftop module 10, it should be understood that any number of sensors 12 of various types may be used.

A washer system 14 is integrated with the rooftop module 10, in order to wash the sensors 12 so that the sensors 12 may operate at full capability even after becoming dirty, dusty, or obstructed. In FIG. 1, only a portion of the washer system 14 is shown, as a majority of the washer system 12 may be hidden within the rooftop module 10. The washer system 14 includes a plurality of hoses or tubes. For example, the washer system 14 may provide a washing tube 16 and a drying tube 18 to each sensor 12 for washing and drying the respective sensor 12. In the illustration, only one washing tube 16 and one drying tube 18 is shown for clarity, but it should be understood that washing and drying tubes 16, 18 may be provided for each sensor 12. In some examples, each sensor 12 could have its own dedicated washing and drying tubes 16, 18, or in the alternative, each washing tube 16 and each drying tube 18 could serve multiple sensors 12. In the alternative to using a separate washing tube 16 and drying tube 18 for each sensor 12, the washing and drying functions could be combined into a single tube, or the drying function and tube could be omitted.

The washer system 14 has many connections and tubes, many of which are not shown in FIG. 1. Given the many connections and tubes provided by the washer system 14, it is desirable to check the washer system 14 for leaks, adequate flow, and any other flow anomalies after it is assembled, to ensure that there are no wrong connections, kinks, or leaks within the washer system 14.

Accordingly, a flow check system 20 is provided for detecting flow anomalies, such as leaks and insufficient flow, within the washer system 14. The flow check system 20 includes an array 22 of sound sensors configured to collect sound information originating with the washer system 14.

The array 22 of sound sensors may include a plurality of microphones 24 spaced in a circular arrangement with a first predetermined distance D1 between each adjacent microphone 24. Sound signals are simultaneously collected by microphones 24 (or collected within known time delays) and processed to form a representation of the location of the sound sources. For example, beamforming may be used to delay each microphone signal relatively and then add the signals together, thereby amplifying signals in one direction and cancelling signals in other directions. The resulting signal is then calculated and reported on a power map at a pixel corresponding to the direction, and then the process may be performed again in other directions. The array 22 of sound sensors 24 may be located, for example, a distance D2 between 1 and 2 meters from the washer system 14, and more particularly, from predetermined expected flow locations.

The flow check system 20 may also include a camera 26 configured to obtain an image of the washer system 14. A controller 28 may be configured to collect the sound information from the array 22 of sound sensors 24 and collect an image of the washer system 14 from the camera. The sound information that is processed into sound images may be overlaid onto the image of the washer system 14 to identify the location of the detected sounds, as will be described in further detail below. Accordingly, the system 20 is able to determine a location of a flow anomaly in the washer system 14 based on the sound information and the image of the washer system 14.

Figure 2:
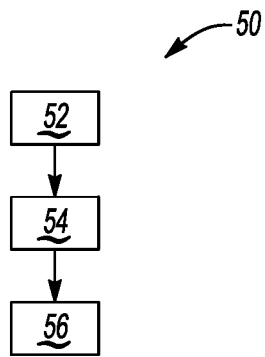
FIG. 2 is a block diagram illustrating a method of detecting a location of a flow anomaly in a washer system, according to the principles of the present disclosure.

Referring now to FIG. 2, and with continued referenced to FIG. 1, a method 50 of detecting a location of a flow anomaly in a washer system, such as the illustrated washer system 14, is shown. The method 50 includes a step 52 of collecting sound information originating from the washer system 14, such as through the array 22 of sound sensors 24, as described above. The method 50 also includes a step 54 of collecting an image of the washer system 14, as described above. Further, the method 50 includes a step 56 of determining a location of a flow anomaly in the washer system 14 based on the sound information and the image of the washer system 14.

The flow check system 20 and method 50 may be configured to provide pressurized air, for example, through an air compressor or air flow generator 30, to both the first and second pluralities of tubes 16, 18 to check for flow anomalies through both the first and second pluralities of tubes 16, 18. When pressurized air is provided through the tubes 16, 18, the steps 52, 54, 56 of collecting the sound information, the washer system image, and detecting the flow anomalies are then performed. The air flow generator 30 may be controlled by the controller 28, or an onboard controller 32, by way of example.

Figure 3:
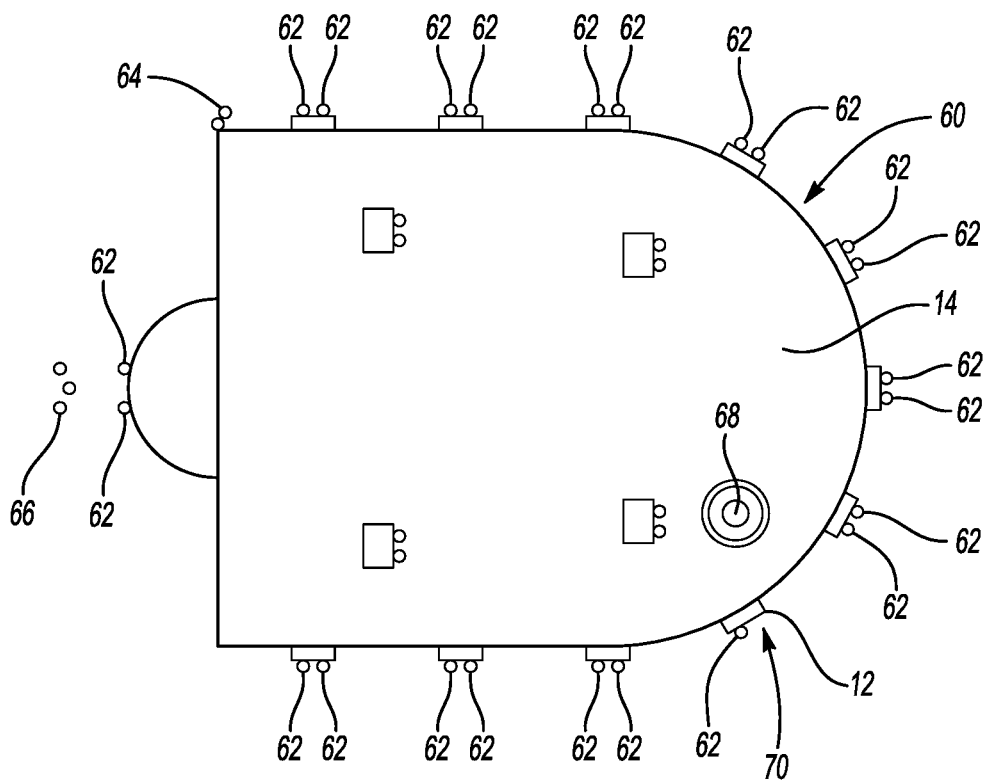
FIG. 3 is a schematic view of an image of the washer system of FIG. 1 having sound images overlaid onto the image of the washer system, in accordance with the principles of the present disclosure.

Referring now to FIG. 3, an image 60 of the washer system 14 having sound location information overlaid onto the image 60 is shown. Actual locations of flow based on the sound information are indicated as sound marks or pixels at 62, 64, 66, and 68. Flow is expected at the orifices at the ends of the tubes 16, 18, and the expected flow locations and intensities may be calibrated or programmed into the controller 28. The sound marks 62 represent the expected flow at the orifices at the ends of the tubes 16, 18. Thus, these sound marks 62 are located in expected flow locations, which are at the end orifices of the tubes 16, 18.

The sound marks 64 shown in the upper left corner of the orientation of the image 60 of FIG. 3, however, are not expected. Sound marks 64 show that there is sound from air flow at the location of the sound marks 64. This sound is unexpected because there is no expected opening of the tubes 16, 18 in this location, based on the calibrated information about where the flow should be expected. Therefore, sound marks 64 represent a leak in the washer system 14. The leak illustrated by the sound marks 64 may have been caused by a failure of a connection, misconnection, missing O-ring, or a hole in a tube 16, 18, by way of example.

Similarly, the sound marks 66 shown on the left side of the image 60 of FIG. 3 show that there is sound from air flow at the location of the marks 66. This sound is also unexpected because there is no expected opening of tubes 16, 18 in this location. Therefore, the sound marks 66 also represent a leak in the washer system 14. The leak illustrated by the sound marks 66 may have been caused by a failure of a connection, misconnection, missing O-ring, or a hole in a tube 16, 18, by way of example.

The sound marks 68 shown on the lower right side of the image 60 of FIG. 3 show that there is sound from the flow at the location of the marks 68. This sound is also unexpected because there is not supposed be an opening of tubes 16, 18 in this location. The sound marks 68 represent a missed connection of one of the tubes 16, 18 of the washer system 14. Due to the missed connection, FIG. 3 also shows that there is no flow at the expected location 70. Due to the tube not being connected, no flow ever reached the sensor 12 adjacent to the expected flow location 70. In other examples, the flow may also be detected to be less than expected if there is a kink in a tube 16, 18.

Thus, the system 20 and method 50 may be configured to identify the actual locations having at least a predetermined amount of flow from the washer system 14, based on the sound information, and then compare the actual locations having at least the predetermined amount of flow to the predetermined expected flow locations. The location of the flow anomaly may then be determined to be the actual location of flow that has at least a predetermined threshold amount of flow that is outside of the predetermined expected flow locations, such as at the locations of the marks 64, 66, and 68. There is also a flow anomaly at location 70 because less flow than expected is detected at that location. Thus, the flow anomaly detected may be a leak or a flow that is lower than expected by a predetermined threshold.

The image information shown in FIG. 3 includes the plurality of images 62, 64, 66, 68 indicating locations of the sound information that are overlaid onto the image 60 of the washer system 14. In some examples, the plurality of images indicating locations of the sound information may vary in size based on sound intensity. For example, the sound mark 68 is larger than the other illustrated sound marks 62, 64, 66, which indicates that more sound, and therefore, a larger leak, has been detected at the location of the mark 68 than the sounds detected at the leaks represented by 64 and 66.

The plurality of images 62, 64, 66, 68 indicating locations of the sound information may also vary in color based on sound intensity. For example, the sound information may be shown in the form of a heat map, where a low amount of sound may be shown as green, a higher amount of sound shown by yellow, and an even higher amount of sound may be shown with red. In this example, the sound mark 68 may be red, while the rest of the unexpected sound marks 64, 66 could be yellow or green. The sound image information may also be filtered in any desirable way, such as by eliminating images representative of sound having an intensity lower than a predetermined threshold. For example, sounds marks that are smaller than a predetermined threshold, or that have a "low flow" color (such as green), may be eliminated to perform the analysis.

The controller 28 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 28 may communicate with an electronic control unit (ECU) 32 that communicates with various vehicle systems or may directly control the vehicle systems. For example, either the controller 28 or the ECU 32 or other vehicle controller may be used to control the air flow generator 30, which may be onboard or offboard the vehicle.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The controller 28 of the flow check system 20, which may be used to implement the method 50, may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some examples for carrying out the claimed disclosure have been described in detail, various alternative designs and examples exist for practicing the disclosure defined in the appended claims. Furthermore, the examples shown in the drawings or the characteristics of various examples mentioned in the present description are not necessarily to be understood as examples independent of each other. Rather, it is possible that each of the characteristics described in one of the examples of an example can be combined with one or a plurality of other desired characteristics from other examples, resulting in other examples not described in words or by reference to the drawings. Accordingly, such other examples fall within the framework of the scope of the appended claims.

What is claimed is:

1. A flow check system for a washer system, the flow check system comprising:
an array of sound sensors configured to collect sound information originating with the washer system; and
a controller configured to:
collect the sound information from the array of sound sensors;
collect an image of the washer system;
identify a plurality of actual locations having at least a predetermined amount of flow from the washer system, based on the sound information, wherein the predetermined amount of flow is a predetermined amount of air flow;
compare the plurality of actual locations having at least the predetermined amount of flow to a plurality of predetermined expected flow locations; and
determine a location of a flow anomaly in the washer system based on the sound information and the image of the washer system, wherein the controller is configured to determine the location of the flow anomaly in the washer system as being an actual location having at least the predetermined amount of flow that is outside of the plurality of predetermined expected flow locations,
wherein the array of sound sensors is located a distance between 1 and 2 meters from the plurality of predetermined expected flow locations.

2. The flow check system of claim 1, wherein the flow anomaly is one of a leak and a flow that is lower than expected by a predetermined threshold.

3. The flow check system of claim 2, further comprising a camera configured to obtain the image of the washer system, wherein the array of sounds sensors includes a plurality of microphones.

4. The flow check system of claim 2, wherein the array of sound sensors includes a plurality of microphones spaced in a circular arrangement with a first predetermined distance between each microphone of the plurality of microphones.

5. The flow check system of claim 1, the controller being further configured to create a plurality of images indicating locations of the sound information and to overlay the plurality of images indicating the locations of the sound information onto the image of the washer system.

6. The flow check system of claim 5, the plurality of images indicating locations of the sound information varying in at least one of size and color, based on sound intensity.

7. The flow check system of claim 6, the controller being configured to filter the plurality of images indicating locations of the sound information to eliminate images representative of sound having an intensity lower than a predetermined threshold.

8. A flow check system for a washer system, the flow check system comprising:
an array of sound sensors configured to collect sound information originating with the washer system; and
a controller configured to:
collect the sound information from the array of sound sensors;
collect an image of the washer system;
identify a plurality of actual locations having at least a predetermined amount of flow from the washer system, based on the sound information, wherein the predetermined amount of flow is a predetermined amount of air flow;
compare the plurality of actual locations having at least the predetermined amount of flow to a plurality of predetermined expected flow locations; and
determine a location of a flow anomaly in the washer system based on the sound information and the image of the washer system, wherein the controller is configured to determine the location of the flow anomaly in the washer system as being an actual location having at least the predetermined amount of flow that is outside of the plurality of predetermined expected flow locations,
the washer system being an autonomous vehicle washer system having a first plurality of tubes configured to provide liquid washer fluid to a plurality of autonomous vehicle sensors, the autonomous vehicle washer system having a second plurality of tubes configured to provide drying air to the plurality of autonomous vehicle sensors, the flow check system further comprising an air flow generator configured to provide pressurized air to both the first and second pluralities of tubes to check the flow through both the first and second pluralities of tubes.

9. A method of detecting a location of a flow anomaly in a washer system, the method comprising:
collecting sound information originating from the washer system;
collecting an image of the washer system; and
determining a location of a flow anomaly in the washer system based on the sound information and the image of the washer system,
the washer system being an autonomous vehicle washer system having a first plurality of tubes configured to provide liquid washer fluid to a plurality of autonomous vehicle sensors, the autonomous vehicle washer system having a second plurality of tubes configured to provide drying air to the plurality of autonomous vehicle sensors, the method further comprising providing pressurized air to both the first and second pluralities of tubes to check for flow anomalies through both the first and second pluralities of tubes.

10. The method of claim 9, wherein the flow anomaly is one of a leak and a flow that is lower than expected by a predetermined threshold.

11. The method of claim 10, further comprising:
identifying a plurality of actual locations having at least a predetermined amount of flow from the washer system, based on the sound information;
comparing the plurality of actual locations having at least the predetermined amount of flow to a plurality of predetermined expected flow locations; and
determining the location of the flow anomaly in the washer system as being an actual location having at least the predetermined amount of flow that is outside of the plurality of predetermined expected flow locations.

12. The method of claim 11, wherein the predetermined amount of flow is a predetermined amount of air flow, the method further comprising collecting the sound information with an array of sound sensors.

13. The method of claim 9, further comprising create a plurality of images indicating locations of the sound information and overlaying the plurality of images indicating the locations of the sound information onto the image of the washer system.

14. The method of claim 13, the plurality of images indicating locations of the sound information varying in size based on sound intensity.

15. The method of claim 13, the plurality of images indicating locations of the sound information varying in color based on sound intensity.

16. The method of claim 13, further comprising filtering the plurality of images indicating locations of the sound information to eliminate images representative of sound having an intensity lower than a predetermined threshold.

* * * * *